United States Patent
Fujihara (10) Patent No.: US 8,848,790 B2
(45) Date of Patent: Sep. 30, 2014

(54) ENCODING PROCESSING APPARATUS AND METHOD FOR A MOVING IMAGE

(75) Inventor: Masahiro Fujihara, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1718 days.

(21) Appl. No.: 11/872,862

(22) Filed: Oct. 16, 2007

(65) Prior Publication Data

US 2008/0198929 A1     Aug. 21, 2008

(30) Foreign Application Priority Data

Nov. 17, 2006   (JP) .................................. 2006-311369

(51) Int. Cl.
| | |
|---|---|
| H04N 7/12 | (2006.01) |
| H04N 19/107 | (2014.01) |
| H04N 19/114 | (2014.01) |
| H04N 19/164 | (2014.01) |
| H04N 19/61 | (2014.01) |
| H04N 19/172 | (2014.01) |
| H04N 19/89 | (2014.01) |

(52) U.S. Cl.
CPC ..... *H04N 19/00054* (2013.01); *H04N 19/0003* (2013.01); *H04N 19/00236* (2013.01); *H04N 19/00781* (2013.01); *H04N 19/00266* (2013.01); *H04N 19/00939* (2013.01)
USPC ............. 375/240.13; 375/240.05; 375/240.07

(58) Field of Classification Search
None
See application file for complete search history.

(56) References Cited

U.S. PATENT DOCUMENTS

| | | | | |
|---|---|---|---|---|
| 5,528,284 | A  * | 6/1996 | Iwami et al. ................ | 348/14.15 |
| 7,784,076 | B2 * | 8/2010 | Demircin et al. ............... | 725/81 |
| 2005/0220353 | A1* | 10/2005 | Karczewicz et al. ......... | 382/238 |
| 2006/0165090 | A1* | 7/2006 | Kalliola et al. .......... | 370/395.21 |
| 2008/0008092 | A1* | 1/2008 | Wang et al. ................... | 370/235 |

FOREIGN PATENT DOCUMENTS

| | | |
|---|---|---|
| JP | 6-237451 | 8/1994 |
| JP | 2001-57672 | 2/2001 |
| JP | 2004-193850 | 7/2004 |

OTHER PUBLICATIONS

Notification of Reason(s) for Refusal dated Nov. 2, 2010, from the corresponding Japanese Application.
Notification of Reason(s) for Refusal dated Feb. 22, 2011, from corresponding Japanese Application No. 2006-311369.

* cited by examiner

*Primary Examiner* — Faruk Hamza
*Assistant Examiner* — Thinh Tran
(74) *Attorney, Agent, or Firm* — Katten Muchin Rosenman LLP (57) ABSTRACT

A video encoder interframe-encodes a moving image captured by a camera and generates a video code stream. An I frame send request manager receives from a receiver of the video code stream a request signal for requesting to send an I frame that has not been interframe-encoded, when any frame of the moving image is not properly received at the receiver. Then the request manager determines whether or not to accept the received request signal. When the request manager determines to accept the request signal, the request manager supplies an I frame setting signal to the video encoder. Upon receiving the I frame setting signal, the video encoder sets the type of a next frame to be encoded to an I frame and then interframe-encodes the moving image.

8 Claims, 9 Drawing Sheets

ENCODING PROCESSING APPARATUS AND METHOD FOR A MOVING IMAGE

BACKGROUND OF THE INVENTION

1. Field of the Invention

This invention relates to an apparatus and method for encoding a moving image.

2. Description of the Related Art

The widespread use of broadband networking has actively encouraged the distribution of video and audio stream over the Internet. The stream distribution has been used for various types of Internet services, such as Internet telephone, remote television conference, chat or the like. The chat system using an audio/video stream allows one user to transmit her/his facial image and/or voice to another user in a remote location over the network. The users can replay the each other's moving image and voice on their terminal so that they can chat with each other as if they were together in the same place.

The video stream distribution can be realized in the following procedure. A video stream is generated in which each frame of the moving image is compression-encoded in accordance with a moving image encoding method such as MPEG (Moving Picture Experts Group), H.264/AVC (Advanced Video Coding) or the like. Then the video stream is packetized into IP (Internet Protocol) packets and the packets are transferred over the Internet and received at the communication terminal of the user. Since the Internet transmits packets on a best effort basis, if the network is congested, some of the packets could be discarded or delayed resulting in data deficiency so that the frame image could not be received properly.

Japanese Patent Application Laid-Open No. 2001-57672 discloses a communication device that communicates image data and audio data with a plurality of the other communication devices.

If a chat system is configured to use video and audio via the Internet, the IP packets could be lost at a few percents level even in a normal situation so that at least a part of a frame of the video code stream might be possibly lost and the frame could not be decoded properly. The real-timeliness is the most important factor in such a chat system and it could be fatal that the reproduction quality of the motion image is degraded because of such frame dropping. In the video stream distribution, if frame dropping occurs, the receiver could request the sender to retransmit the dropped frame so as to receive the dropped frame again from the sender. However, even if the retransmitted frame were reproduced, the delay would grow, the real-timeliness might be lost and the system could not meet requirements on quality of the reproduced moving image, especially for a time-critical application such as a chat system. Furthermore, since the sender side needs to store the frames that have been transmitted in order to retransmit the frames, an additional capacity of memory will be required for the retransmission purpose.

SUMMARY OF THE INVENTION

The present invention has been achieved in view of the foregoing problems. It is thus a general purpose of the present invention to provide a moving image encoding technology for distributing a moving image in real time via a network.

To solve the foregoing problems, an encoding processing apparatus according to one of the embodiments of the present invention comprises: an encoder which interframe-encodes a moving image so as to generate a video code stream; and a request manager which receives from a receiver of the video code stream a request signal for requesting to send a reference frame when a frame of the moving image is not properly received at the receiver, the reference frame being a frame that has not been interframe-encoded. When the request manager receives the request signal, the encoder sets a type of a next frame to be encoded to a reference frame so as to interframe-encode the moving image.

Herein, "when a frame of the moving image is not properly received at the receiver" shall refer to, for instance, the case in which at least a part of a frame is not received because of packet loss in a network or the case in which a frame is not received in time for decoding because of packet delay. When such frame dropping occurs, the subsequent frames that have been interframe-encoded cannot be properly decoded and therefore the moving image cannot be properly reproduced. When the frame dropping occurs, the receiver may send to the sender a request for sending a reference frame so as to receive from the sender the frames of the moving image that have been encoded based on a newly set reference frame. This will minimize the number of the dropped frames of the moving image.

Another embodiment of the present invention provides an encoding processing apparatus. This apparatus comprises: an encoder which interframe-encodes a moving image so as to generate a video code stream; and a request manager which receives from at least one of a plurality of receivers of the video code stream a request signal for requesting to send a reference frame when a frame of the moving image is not properly received at least the one of the receivers, the reference frame being a frame that has not been interframe-encoded, and which determines whether or not to accept the received request signal. When the request manager determines to accept the request signal, the encoder sets a type of a next frame to be encoded to a reference frame so as to interframe-encode the moving image.

Yet another embodiment of the present invention provides a computer program product for a use with a computer system. The computer program product comprises: an encoding module for interframe-encoding a moving image so as to generate a video code stream; and a request managing module for receiving from a receiver of the video code stream a request signal for requesting to send a reference frame when a frame of the moving image is not properly received at the receiver, the reference frame being a frame that has not been interframe-encoded. When the request signal is received, the interframe-encoding module sets a type of a next frame to be encoded to a reference frame so as to interframe-encode the moving image.

Yet another embodiment of the present invention provides a computer program product for a use with a computer system. The computer program product comprises: an encoding module for interframe-encoding a moving image so as to generate a video code stream; and a request receiving module for receiving from at least one of a plurality of receivers of the video code stream a request signal for requesting to send a reference frame when a frame of the moving image is not properly received at least the one of the receivers, the reference frame being a frame that has not been interframe-encoded; and a request managing module for determining whether or not to accept the received request signal. When the request signal is accepted, the interframe-encoding module sets a type of a next frame to be encoded to a reference frame so as to interframe-encode the moving image.

This program may be provided as a component for an embedded device firmware for performing a basic control over hardware resources such as video and audio decoders. The firmware may be stored in a semiconductor memory such as a ROM or a flash memory inside the device. A computer readable storage medium having this program embodied therein may be provided for supplying the firmware or updating at least a part of the firmware. Alternatively, this program may be transmitted via a communication line.

It should be appreciated that any combinations of the foregoing components, and any conversions of expressions of the present invention from/into methods, apparatuses, systems, computer programs, data structures, storage media, and the like are also intended to constitute applicable embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
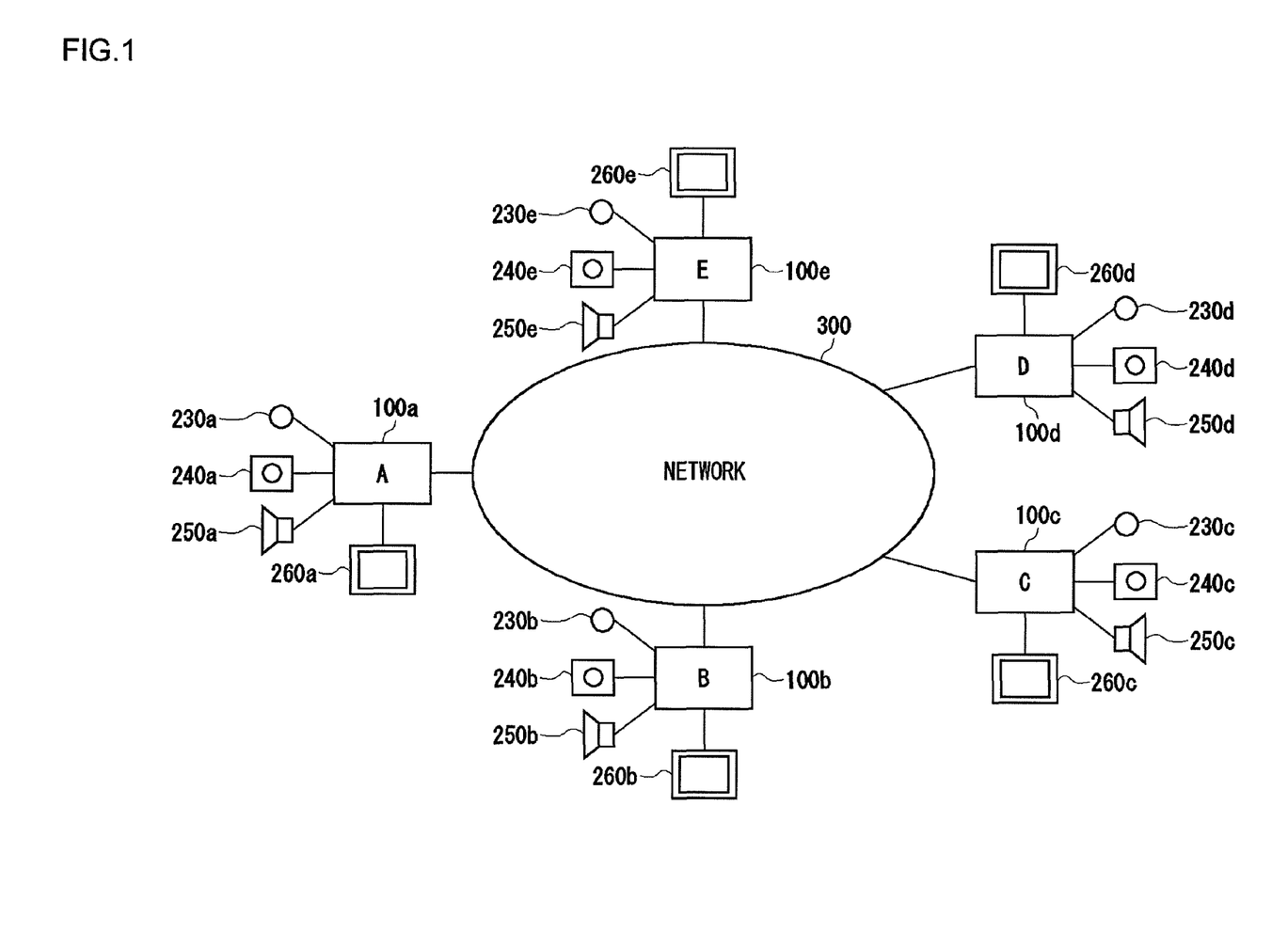
FIG. 1 illustrates a structure of a chat system according to an embodiment.

FIG. 1 illustrates a structure of a chat system according to an embodiment. A plurality of information processing apparatus 100a-100e have the respective microphones 230a-230e, cameras 240a-240e, speakers 250a-250e, and displays 260a-260e. These information processing apparatus 100a-100e are connected to a network 300. A plurality of users on the respective information processing apparatus 100a-100e communicate with each other using audio and/or video, by exchanging her/his facial image and voice in real time and/or exchanging text data input from her/his keyboard. This kind of communication is called a "chat".

Hereinafter, the information processing apparatus 100a-100e of the respective users are also referred to as information processing apparatus A-E. In addition, the components such as information processing apparatus 100a-100e of the respective users are simply denoted by "100", omitting "a-e", when they are generically referred to.

Figure 2:
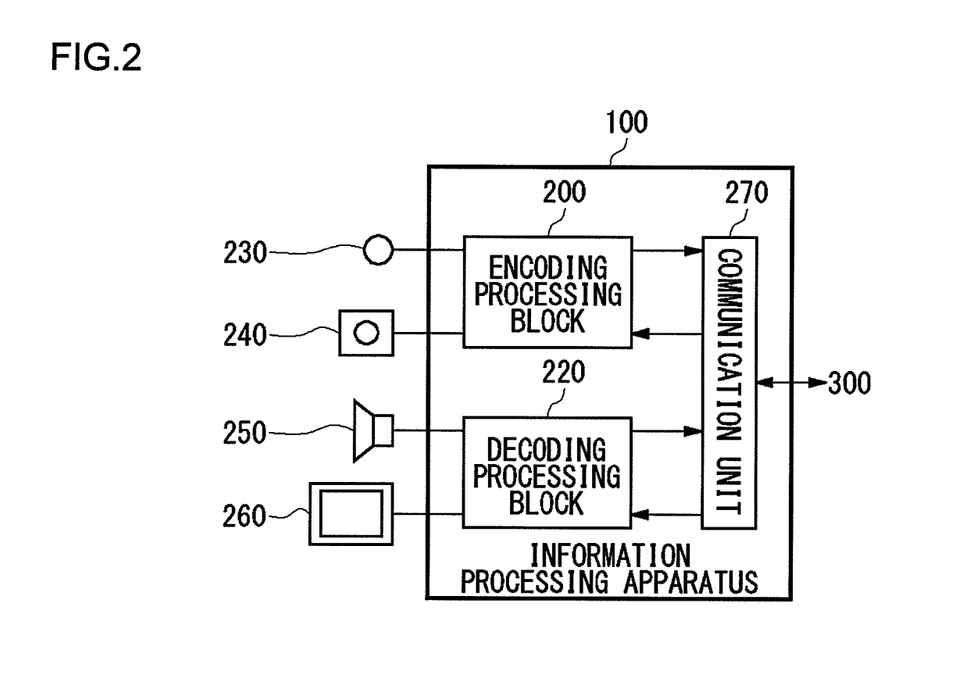
FIG. 2 shows a block diagram of the information processing apparatus of FIG. 1.

FIG. 2 shows a block diagram of the information processing apparatus 100. The figure herein shows the structure related to encoding and decoding audio/video, while omitting any structure related to chatting.

The information processing apparatus 100 includes an encoding processing block 200, a decoding processing block 220 and a communication unit 270. The information processing apparatus 100 may be, for instance, a personal computer or a handheld device. The apparatus 100 may be a multiprocessor system and may be, in particular, a system equipped with a multi-core processor in which multiple processors are integrated into a single package. If the apparatus 100 is a personal computer, the encoding processing block 200 and the decoding processing block 220 can be implemented as a dedicated circuit having an image encoding/decoding function installed on the personal computer. Alternatively, if the information processing apparatus 100 is a multiprocessor system, or in particular a multi-core processor system, the encoding and decoding processing blocks 200, 220 can be realized by software, since the system can rely on a high computing performance of the multiprocessor.

The encoding processing block 200 compression-encodes a voice captured by the microphone 230 and a moving image captured by the camera 240 so as to generate an audio code stream and a video code stream. The audio code stream and the video code stream can be multiplexed into a single stream. The audio and video code streams thus generated by the encoding processing block 200 are packetized by the communication unit 270 and then transmitted to the other party on chat via the network 300.

The communication unit 270 receives the packets of the audio and video code streams from the other party on chat via the network 300 and supplies the packets to the decoding processing block 220. The decoding processing block 220 decodes the audio and video code streams thus received so as to reproduce the audio and video and then outputs the audio and video to the speaker 250 and the display 260 respectively.

If any packet loss occurs because of network congestion or the like and a P (Predictive) frame or a B (Bi-predictive prediction) frame of the moving image is dropped, the decoding processing block 220 sends a request signal to the information processing apparatus 100 of the other party on chat via the communication unit 270, for requesting the other party to send an I (Intra) frame or a reference frame that is not involved in inter-frame encoding. The information apparatus 100 of the other party receives the request signal for sending an I frame via the communication unit 270 and the request signal is input to the encoding processing block 200. The encoding processing block 200 manages the received request signal for sending an I frame and if needed, sets the next frame to be encoded to an I frame. Then the encoding processing block 200 interframe-encodes the video and transmits the video code stream. The details will be described later.

Figure 3:
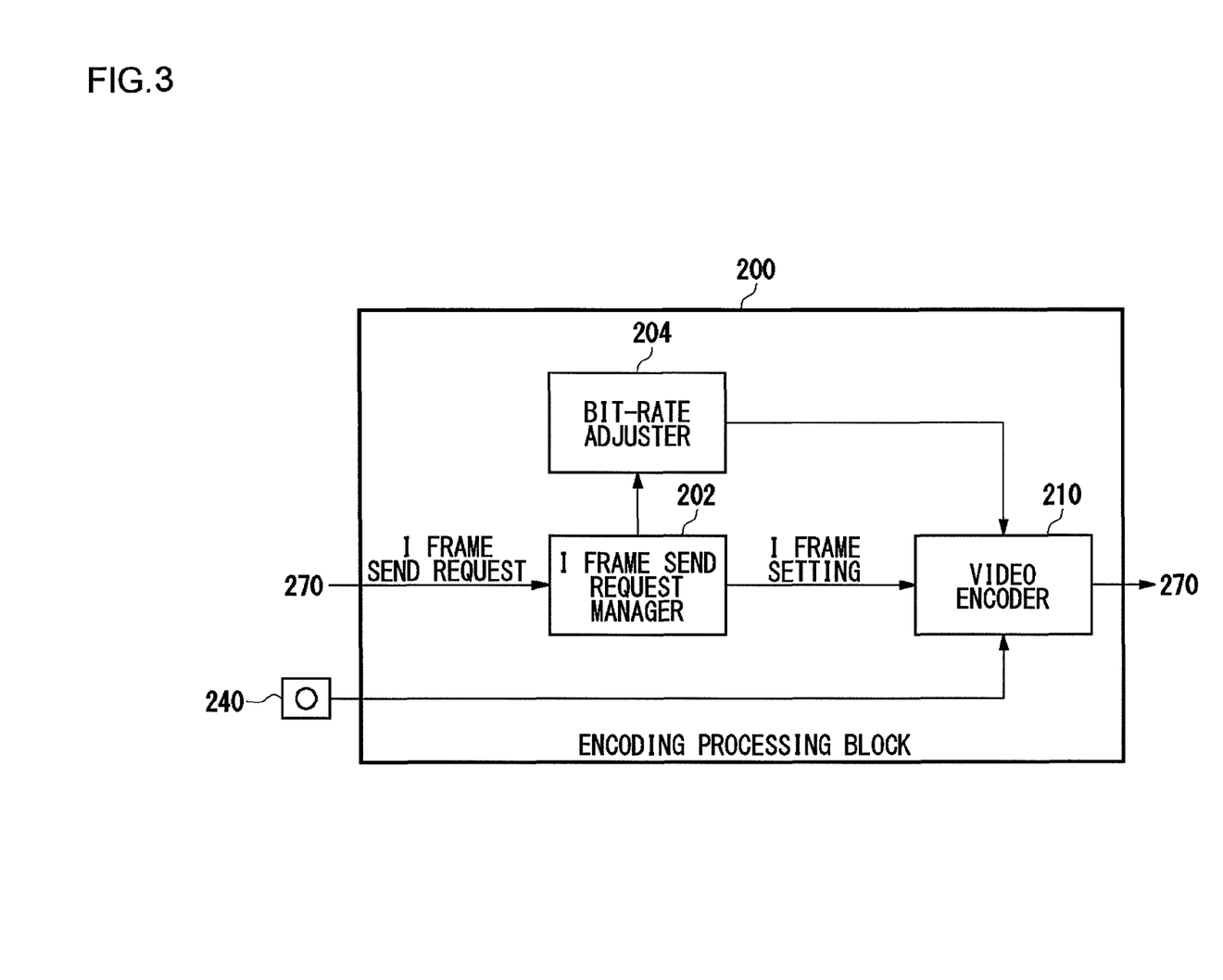
FIG. 3 shows a block diagram of the encoding processing block of FIG. 2.

FIG. 3 shows a block diagram of the encoding processing block 200. The figure herein shows the structure related to encoding the video, while omitting the structure related to encoding the audio.

The encoding processing block 200 includes an I frame send request manager 202, a bit-rate adjuster 204 and a video encoder 210. The I frame send request manager 202 obtains the I frame send request signal that the communication unit 270 has received from the other information processing apparatus 100. In particular, when the network is congested, it is likely that multiple I frame send request signals are successively received from the information processing apparatus 100 of the multiple video receivers and the received request signals are input to the request manager 202.

The request manager 202 manages the I frame send request signals received from the other information processing apparatus 100 and provides the video encoder 210 with a signal for setting the type of frame to be encoded to an I frame. Upon receiving an I frame send request signal from the other information processing apparatus 100, the request manager 202 may immediately provide an I frame setting signal to the video encoder 210. Alternatively when the multiple I frame send requests are successively received from the multiple information processing apparatus 100, the request manager 202 may decide whether or not each of the received I frame send request signals is to be accepted according to a predetermined condition. If any one of the I frame send request signals is accepted, the request manager 202 will provide an I frame setting signal to the video encoder 210.

In addition, the request manager 202 notifies to the bit rate adjuster 204 the status of how frequently the I frame send request signals have been received. The bit rate adjuster 204 adjusts the bit rate for encoding the video according to the status of the frequency of receiving the I frame send request signals and notifies to the video encoder 210 the bit rate thus adjusted. For instance, the bit rate will be decreased in a situation where the I frame send request signals have been received successively without interruption, because it is determined that the network has been constantly congested. The bit rate will be increased in a situation where the receiving interval of the I frame send request signals is equal to or more than a predetermined duration, because it is determined that the network has not been congested.

The video encoder 210 receives from the request manager 202 the I frame setting signal for setting to an I frame the type of the frame to be encoded and also receives from the bit-rate adjuster 204 the value of the adjusted bit rate. The video encoder 210 encodes the moving image captured by the camera 240 so as to generate a video code stream and provides the video code stream to the communication unit 270.

Figure 4:
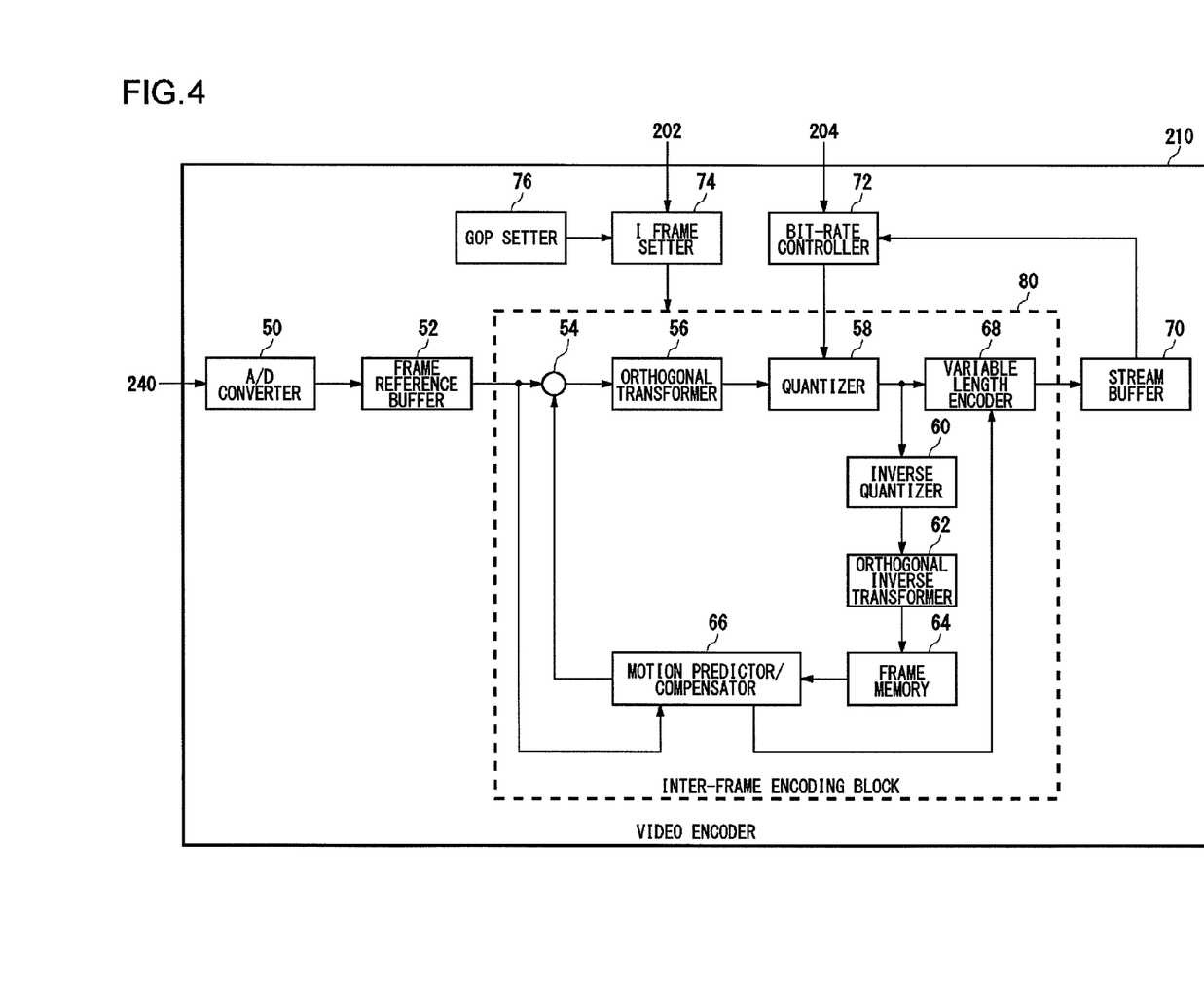
FIG. 4 shows a block diagram of the video encoder of FIG. 3.

FIG. 4 shows a block diagram of the video encoder 210. The figure shows a block diagram focused on functions. These function blocks may be realized in various forms such as hardware only, software only, or a combination thereof.

The video encoder 210 receives the input signal of the moving image by a unit of frame and encodes the frames in compliance with, for instance, H.264/AVC standard so as to output the code stream of the moving image.

An A/D converter 50 digitizes the analog input signal and supplies the digitalized data to a frame reference buffer 52. The frame reference buffer 52 is a buffer that stores the frames to be referenced in interframe predictive coding. Here, the reference frames will be reordered in the buffer. According to H.264/AVC, either a past frame or a future frame can be used as a reference image in interframe predictive coding. In addition, the number of frames available for reference images is not limited. The buffer is provided for storing the reordered frames to be referenced and the reference image(s) is appropriately supplied to a motion predictor/compensator 66.

Using the past or future frame(s) stored in the frame reference buffer as the reference image(s), the motion predictor/compensator 66 makes motion prediction on each of macroblocks of a P frame or a B frame, thereby generating motion vectors and a motion-compensated predicted image. The motion predictor/compensator 66 provides the motion vectors thus generated to a variable length encoder 68 and provides the predicted image to a subtractor 54.

If the image frame supplied from the frame reference buffer 52 is an I frame, the subtractor 54 simply outputs the frame to an orthogonal transformer 56. If the image frame is a P frame or a B frame, the subtractor 54 calculates a difference from the predicted image supplied from the motion predictor/compensator 66, and supplies the difference image to the orthogonal transformer 56.

The orthogonal transformer 56 performs discrete cosine transform (DCT) on the I frame or the difference image of the P/B frame and supplies the resultant DCT coefficients to a quantizer 58.

The quantizer 58 quantizes the DCT coefficients and supplies the resultant to a variable length encoder 68. For the motion compensation, the quantizer 58 supplies the quantified DCT coefficients of the image frame to an inverse quantizer 60. The inverse quantizer 60 inversely quantizes the supplied quantization data, and supplies the resultant to an orthogonal inverse transformer 62. The orthogonal inverse transformer 62 performs inverse discrete cosine transform on the supplied inverse quantization data. This restores the coded image frame. The restored image frame is stored in a frame memory 64.

The motion predictor/compensator 66 references the reconstructed frame stored in the frame memory 64 as a frame to be encoded and makes motion compensation on the frame.

The variable length encoder 68 performs variable length coding on the DCT coefficients quantized by the quantizer 58 and stores the variable length encoded and compressed image data in a stream buffer 70. For the case of the P/B frame, the variable length encoder 68 performs variable length coding on the quantized DCT coefficients of the difference image together with the motion vectors supplied from the motion predictor/compensator 66.

The video code stream including the compressed frame image and the motion vector information is formed in the stream buffer 70. Referring to the bit rate of the video code stream that has been stored in the stream buffer 70, the bit-rate controller 72 adjusts the size of a quantization step to be employed in the quantizer 58. Since the frame image is variable length encoded, the amount of each frame data is not known until the frame is actually encoded. For this reason, the bit-rate controller 72 detects the bit rate of the video code stream that has been stored in the stream buffer 70 and adjusts to an appropriate amount of coded bits by increasing or decreasing the quantization step size so that the code stream can be reproduced at a certain bit rate.

In addition, upon receiving a specified value of the bit rate adjusted by the bit-rate adjuster 204, the bit-rate controller 72 refers to the specified bit-rate and adjusts the quantization step to be employed in the quantizer 58 so that the bit rate can be adjusted from a global perspective in accordance with any external conditions such as network congestion. As an alternative method for adjusting the bit rate, a method of changing the resolution or the frame rate of the moving image may be adopted instead of changing the quantization parameters.

A GOP setter 76 setups a GOP (Group of Picture) that is a unit of encoding the frames of the moving image. For instance, the number of frames constituting a GOP is set to 60 frames. An I frame is inserted at the beginning of the GOP of the 60 frames and the rest of frames (59 frames) are composed of P/B frames to be interframe predictive encoded. The GOP setter 76 may change the number of frames constituting a GOP as appropriate. For instance, the GOP may be renewed at the time when a scene change occurs in the moving image and an I frame may be inserted at the beginning of a new GOP. The GOP setter 76 supplies the GOP information to an I frame setter 74. The I frame setter 74 supplies an I frame setting signal to an inter-frame encoding block 80 at the beginning of the new GOP so that the type of frame to be encoded can be reset to an I frame.

In addition, upon receiving an I frame setting signal from the I frame send request manager 202, the I frame setter 74 supplies the I frame setting signal to the inter-frame encoding block 80. Thereby, the type of frame to be encoded can be reset to an I frame within even a single GOP in response to the instruction given by the I frame send request manager 202.

The inter-frame encoding block 80 includes the above-mentioned subtractor 54, orthogonal transformer 56, quantizer 58, inverse quantizer 60, orthogonal inverse transformer 62, frame memory 64, motion predictor/compensator 66, and variable length encoder 68. If any I frame setting signal is received from the I frame setter 74, the inter-frame encoding block 80 performs I frame encoding and otherwise the block 80 performs P/B frame encoding based on the interframe prediction.

Hereinafter, we consider that the video code stream is sent from the sender-side information processing apparatus 100 to the receiver-side apparatus 100. A description will be given how the type of frame to be encoded by the encoding processing block 200 of the sender-side apparatus 100 will be changed to an I frame, when the I frame send request is sent from the decoding processing block 220 of the receiver-side apparatus 100.

Figure 5A:
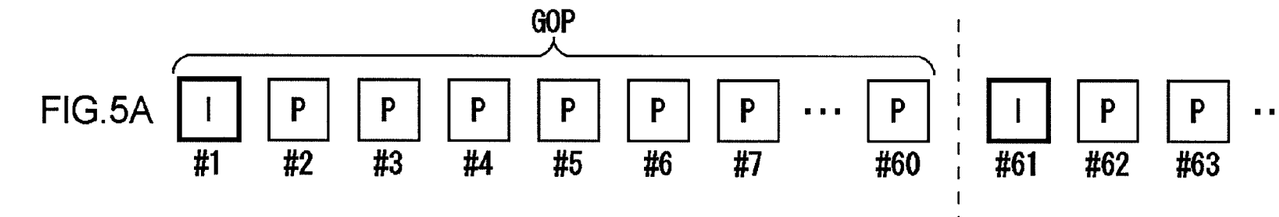
FIGS. 5A to 5C show how the system switches to I frame encoding in response to an I frame send request.
Figure 5B:
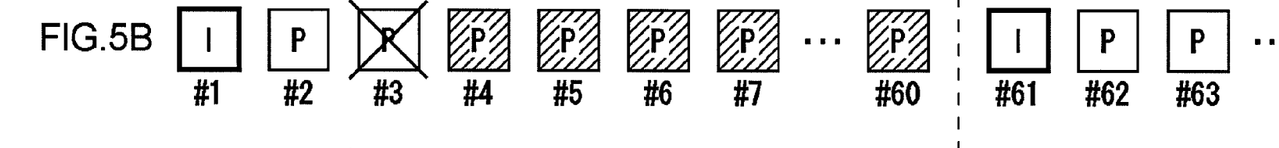
Figure 5C:
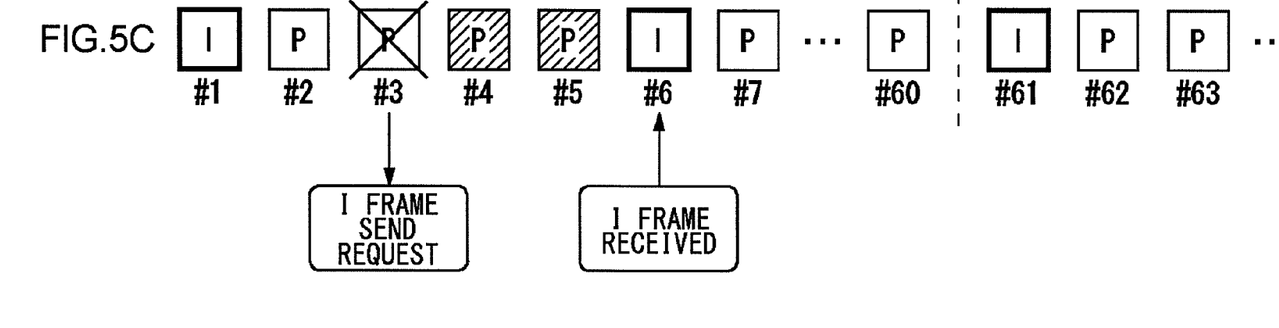

FIGS. 5A to 5C show how the system switches to I frame encoding in response to the I frame send request. FIG. 5A shows how the video code stream is decoded GOP by GOP by the decoding processing block 220 of the information processing apparatus 100 when no frame has been dropped. Herein, GOP includes sixty frames (#1 to #60) and a single GOP is reproduced for two seconds, for instance. In other words, the frame rate is 30 frames/sec.

The GOP of the video code stream begins by an I frame (#1). The I frame can be decoded by itself without relying on any other frames and thereby a single frame image is reproduced. The subsequent 59 frames are P frames (#2 to #60) in this example. In the P frame, only the difference from the previous frame is encoded. The difference data obtained by decoding the P frame is added to the previous frame so that a single frame image is reproduced.

FIG. 5B shows the case where at least a part of the third frame, that is a P frame, is not properly received because of packet loss in the network. Since the third P frame #3 is not properly reproduced, the fourth and subsequent frames cannot be properly reproduced, even if the subsequent P frames #4 to #60 could be received properly. The frames that cannot be reproduced properly are shown by oblique lines in the figure. In order to maintain the quality of the reproduced image, the motion of the moving image needs to pause at the time when the frame image reproduced from the second frame (P frame #2) is displayed and the reproduction of the subsequent frames will have to be abandoned.

When all the sixty frames composing the first GOP are received and the first I frame #61 of the next GOP is received, the I frame #61 can be decoded by itself so that the frame image will be reproduced again. Therefore, the screen that has stayed on the second frame image will be switched to the image of the I frame #61 when the next GOP starts and then the reproduction of the moving image will restart. Since it takes two seconds to reproduce a single GOP, a user will see a still image for the two seconds and the real-timeliness will be lost.

To resolve the problem, the decoding processing block 220 of the information processing apparatus 100 requests the encoding processing block 200 of the sender-side apparatus 100 to send an I frame, when a frame is dropped within a GOP. As shown FIG. 5C, when the P frame #3 is lost, the decoding processing block 220 that has been receiving the video code stream sends an I frame send request signal to the encoding processing block 200 of the sender-side. Upon receiving the I frame send request signal, the encoding processing block 200 of the sender-side switches the type of frame to be encoded to an I frame at the time and then interframe-encodes the subsequent frames.

The encoding processing block 200 of the sender-side sends the encoded I frame #6 and the subsequent P frames #7 to #60 to the decoding processing block 220 of the receiver side. Then, the decoding processing block 220 decodes the I frame #6 and thereafter decodes the P frames #7 to #60 that are difference frames generated by using the I frame #6 as a reference frame. Since the corrupted P frame #3 and the P frames #4, #5 before the arrival of the new I frame #6 in response to the I frame send request cannot be properly decoded, these frames must be skipped, however, the sixth and subsequent frames #6 to #60 will be properly reproduced. It should be noted that the duration of time from when the I frame send request is received till when a new I frame arrives depends on the network latency and the processing latency of the encoding processing block 200.

In the above description, upon receiving the I frame send request signal from the decoding processing blocks 220 of any one of the multiple information processing apparatus 100 of the receiver-side, the I frame send request manager 202 of the encoding processing block 200 controls the video encoder 210 to switch the type of frame to be encoded to an I frame.

However, since the I frame send request signals could be successively received from the decoding processing blocks 220 of the multiple information processing apparatus 100 of the receiver-side especially when the network is congested, it is not always desirable to respond to all the received I frame send request signals. To work on this situation, a further improvement is that the I frame send request manager 202 determines to accept the received I frame request signals under a certain predefined condition and controls the video encoder 210 to switch the type of frame to be encoded to an I frame only if any I frame send request signal is accepted. Hereinafter, this improvement is described with reference to FIGS. 6 to FIGS. 8.

Figure 6:
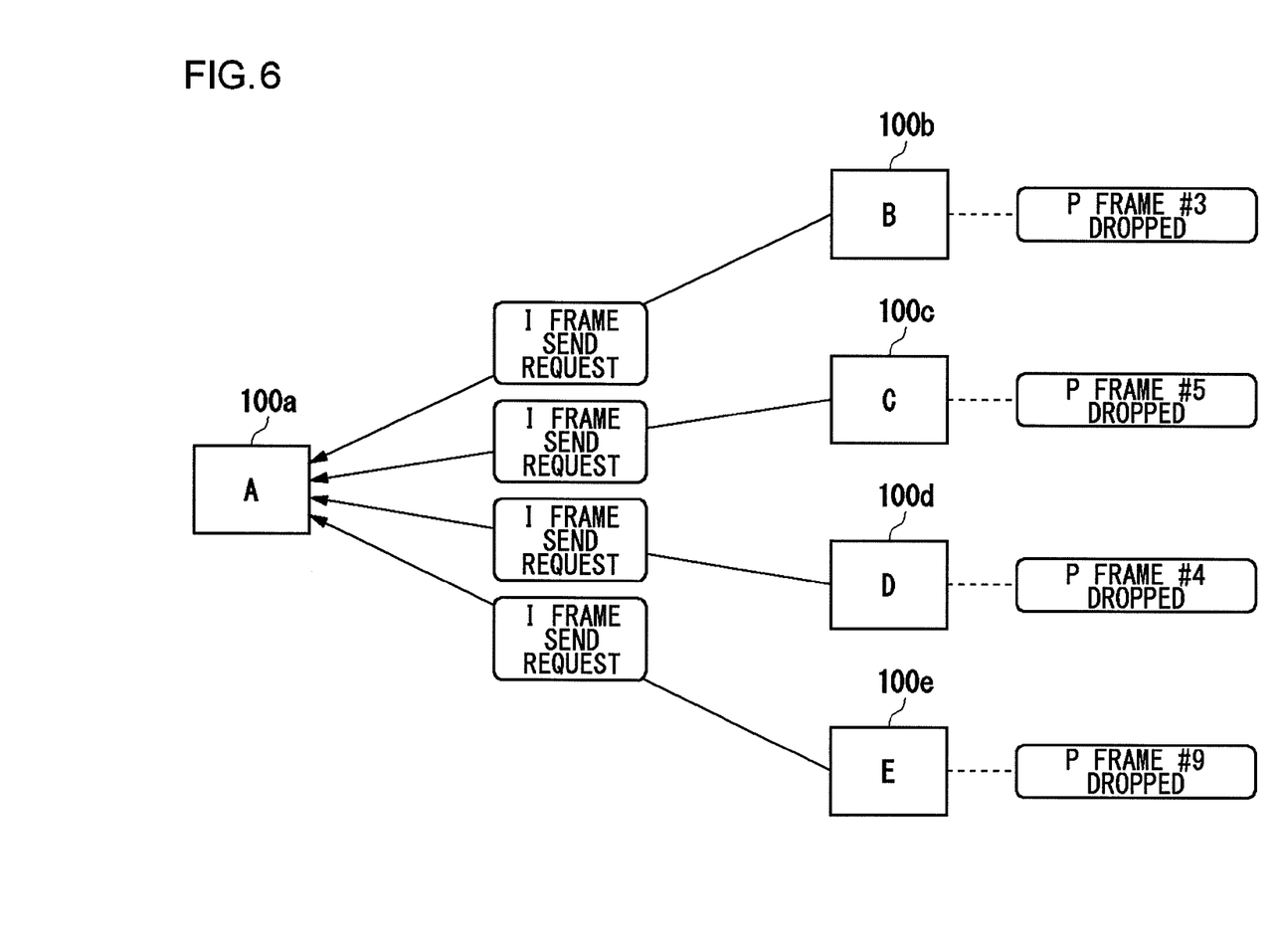
FIG. 6 shows how the multiple I frame send request signals are received at a single information processing apparatus.

FIG. 6 shows how the multiple I frame send request signals are received at a single information processing apparatus 100. We consider a situation in which an information processing apparatus A (100*a*) is sending a video code stream to the other information processing apparatus B, C, D and E (100*b*-100*e*). We assume that P frame #3, P frame #5, P frame #4 and P frame #9 are lost respectively at the receiver-side apparatus B, C, D, and E. The receiver-side apparatus B, C, D, and E send the respective I frame send request signals to the sender-side apparatus A at the time when the respective frames are lost. Therefore, the four I frame send request signals will be received at the sender-side apparatus A at different timings.

Figures 7A, 7B, 7C, 7D:
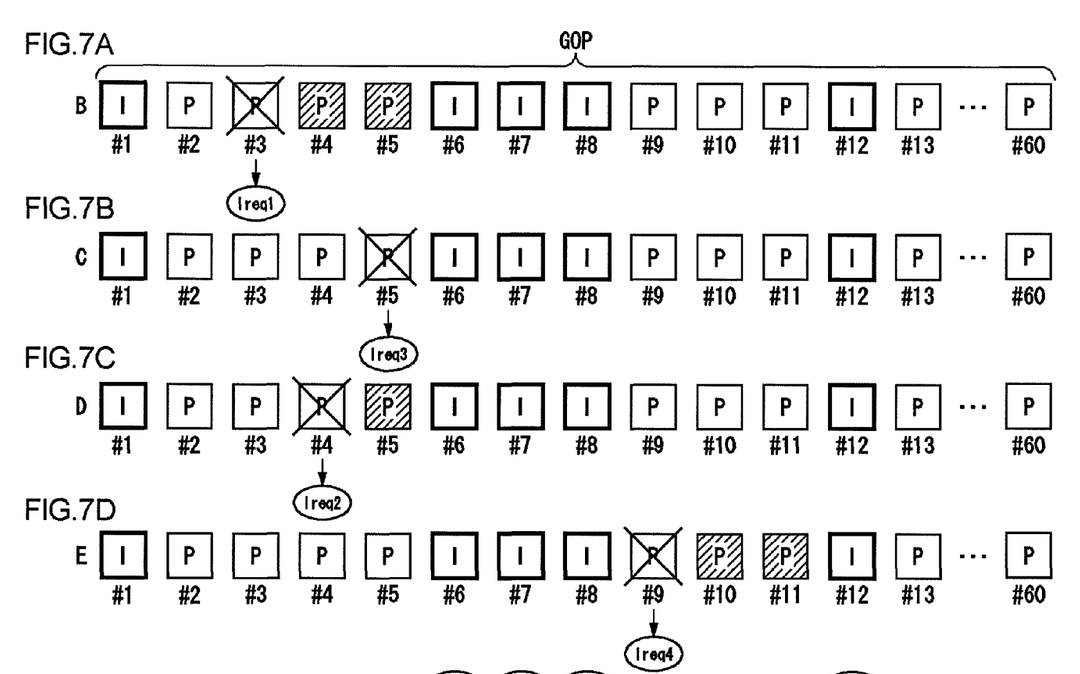
FIGS. 7A to 7E show how a video code stream is generated when all of the received I frame send request signals are accepted and then the type of frame to be encoded is switched to an I frame in response to each of the accepted signals.
Figure 7E:
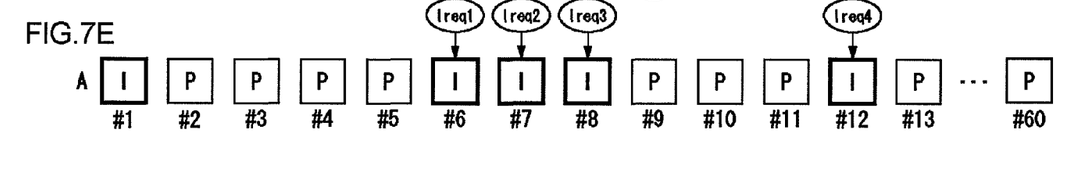

FIGS. 7A to 7E show how the video code stream is generated when all of the received I frame send request signals are accepted and then the type of frame to be encoded is switched to an I frame in response to each of the accepted signals. FIGS. 7A to 7D show the video code streams that the receiver-side information processing apparatus B to E have received respectively, and FIG. 7E shows the video code stream that the sender-side information processing apparatus A has generated.

As shown in FIG. 7A, as soon as finding the P frame #3 dropped, the decoding processing block 220 of the receiver-side apparatus B sends an I frame send request signal Ireq1 to the sender-side apparatus A. Accepting the I frame send request signal Ireq1 sent from the receiver-side apparatus B, the encoding processing block 200 of the sender-side apparatus A switches the type of the sixth frame to be encoded to an I frame, generates the I frame #6 and sends it to the receiver-side apparatus B to E.

Next, as shown in FIG. 7C, as soon as finding the P frame #4 dropped, the decoding processing block 220 of the receiver-side apparatus D sends another I frame send request signal Ireq2 to the sender-side apparatus A. Accepting the I frame send request signal Ireq2 sent from the receiver-side apparatus D, the encoding processing block 200 of the sender-side apparatus A switches the type of the seventh frame to be encoded to an I frame, generates the I frame #7 and sends it to the receiver-side apparatus B to E.

Subsequently, as shown in FIG. 7B, as soon as finding the P frame #5 dropped, the decoding processing block 220 of the receiver-side apparatus C sends yet another I frame send request signal Ireq3 to the sender-side apparatus A. Accepting the I frame send request signal Ireq3 sent from the receiver-side apparatus C, the encoding processing block 200 of the sender-side apparatus A switches the type of the eighth frame to be encoded an I frame, generates the I frame #8 and sends it to the receiver-side apparatus B to E.

Furthermore, as shown in FIG. 7D, as soon as finding the P frame #9 dropped, the decoding processing block 220 of the receiver-side apparatus E sends yet another I frame send request signal Ireq4 to the sender-side apparatus A. Accepting the I frame send request signal Ireq4 sent from the receiver-side apparatus E, the encoding processing block 200 of the sender-side apparatus A switches the type of the twelfth frame to be encoded to an I frame, generates the I frame #12 and sends it to the receiver-side apparatus B to E.

Thus, when the receiver-side apparatus B to E send the I frame request signals in succession, the encoding processing block 200 of the sender-side apparatus A has to always perform the I frame encoding and a heavy load will be placed on the sender-side apparatus A. Furthermore, a number of I frames will be generated in succession, resulting in that the network traffic will increase. It is noted that once an I frame is received, the moving image is refreshed at the time so that a certain degree of the quality of the moving image could be maintained even if some subsequent frames were dropped. Therefore, it is not always necessary to receive the I frames in succession. All of the I frame send request signals need not to be received and some of the received I frame send request signals could be discarded. There will be no harm in restricting the number of the request signals to be accepted.

FIGS. 8A to 8E show how the video code stream is generated when the type of frame to be encoded is switched to an I frame under a restricted number of the I frame send request signals to be accepted.

The four receiver-side apparatus B to E send the I frame send request signals Ireq1 to Ireq4. Unlike FIGS. 7A to 7E, the encoding processing block 200 of the sender-side apparatus A only accepts the I frame send request signals Ireq1 and Ireq4 respectively received from the receiver-side apparatus B and E, but it does not accept the I frame send request signals Ireq2 and Ireq3 respectively received from the receiver-side apparatus C and D and just discards them.

Thereby, the encoding processing block 200 switches the type of the sixth frame to be encoded to an I frame in response to the I frame send request signal Ireq1 received from the apparatus B and also switches the type of the twelfth frame to be encoded to an I frame in response to the I frame send request signal Ireq4 received from the apparatus E. However, the type of the seventh and eighth frames to be encoded are not switched to an I frame and these frames are still encoded as P frames.

Although the I frame send request signals Ireq2 and Ireq3 that the receiver-side apparatus C and D sent have not been accepted and they have been ignored, the I frame send request signal Ireq1 that the receiver-side apparatus B sent has been already accepted. Therefore the sixth frame can be received as an I frame at the apparatus C and D and subsequently the difference images that give the difference from the I frame #6 can be received so that no frame dropping will occur.

After the apparatus E received the I frame #6 in response to the I frame send request signal sent by the apparatus B, the ninth P frame #9 drops. Since the I frame send request signal sent by the apparatus E is accepted, the apparatus E can receive a new I frame #12 as the twelfth frame and thereafter it can receive the difference images that give the difference from the I frame #12 so that frame dropping can be avoided.

Figures 8A, 8B, 8C, 8D:
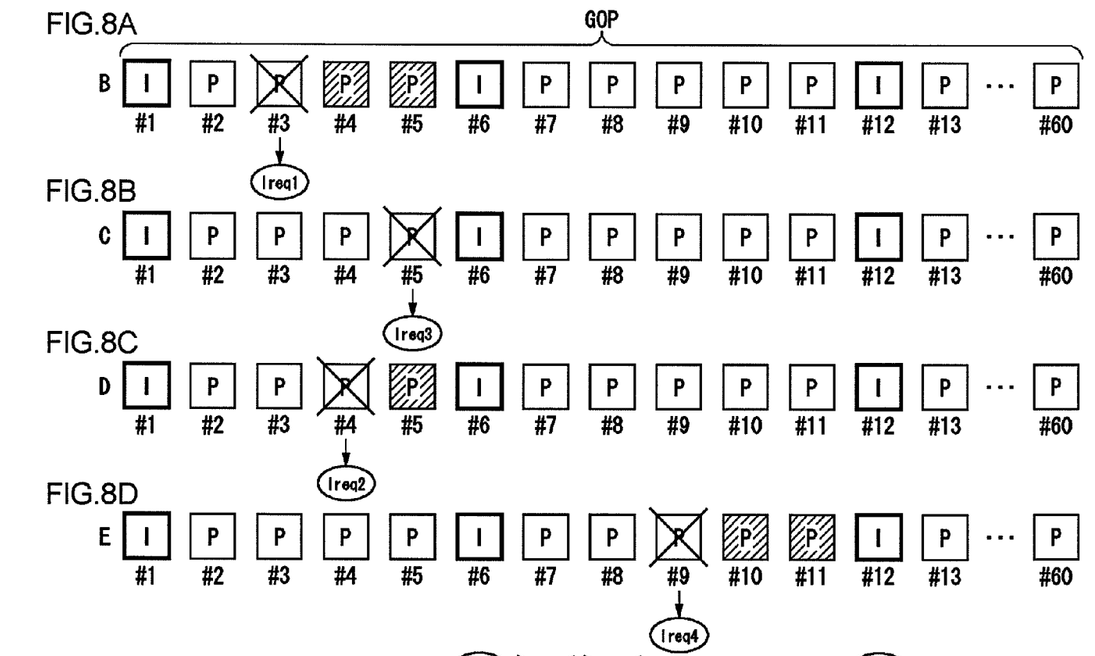
FIGS. 8A to 8E show how a video code stream is generated when the type of frame to be encoded is switched to an I frame under a restricted number of the I frame send request signals to be accepted.
Figure 8E:
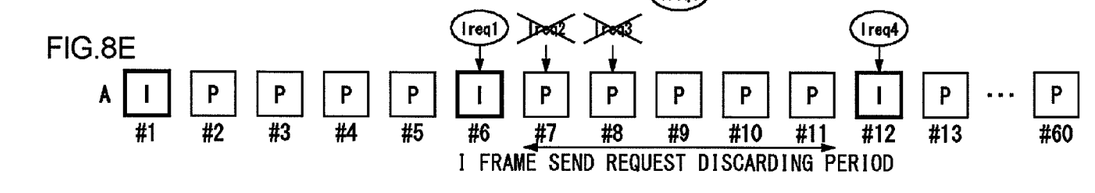

As shown in FIG. 8E, an I frame send request signal discarding period (it is hereinafter referred to as "refusal-of-receipt period") is provided in the encoding processing block 200 of the sender-side apparatus A. The period starts from when the type of the sixth frame to be encoded is switched to an I frame after accepting the first I frame send request signal and extends for the five frames (P frames #7 to #11) to be received. The I frame send request manager 202 ignores any I frame send request signals received during the refusal-of-receipt period but accepts an I frame send request signal received after the refusal-of-receipt period expires.

The refusal-of-receipt period may be defined in terms of the number of frames to be encoded (for instance, 5 frames) or in terms of the time (for instance, 100 milliseconds). In addition, the length of the refusal-of-receipt period may be adapted according to the number of the receiver-side apparatus. The network will be likely to become congested as the number of the receivers increases. For this reason, the refusal-of-receipt period may extend longer so that the number of the I frames to be output can be restricted.

Figure 9:
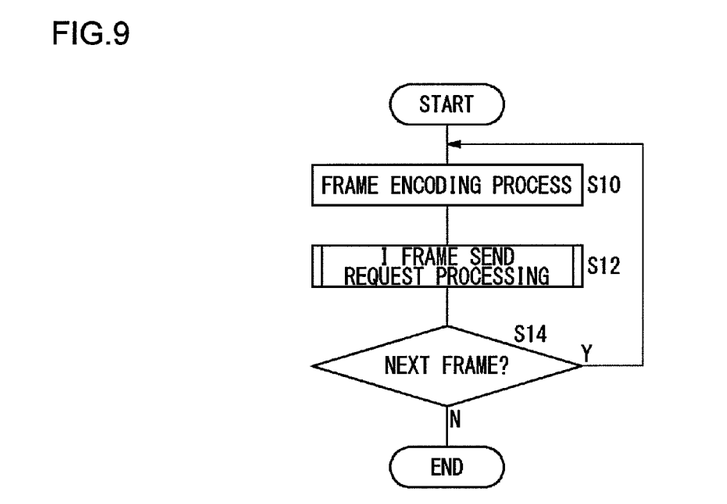
FIG. 9 shows a procedure of the video encoding process employed by the encoding processing block of FIG. 3.

FIG. 9 shows a procedure of the video encoding process employed by the encoding processing block 200. The video encoder 210 of the encoding processing block 200 encodes the frames of the moving image captured by the camera 240 (S10). The I frame send request manager 202 processes the I frame send requests (S12). When a next frame is input (Y of S14), the control is returned to Step S10 and the frame encoding process continues. If the next frame is not input (N of S14), the procedure ends.

Figure 10:
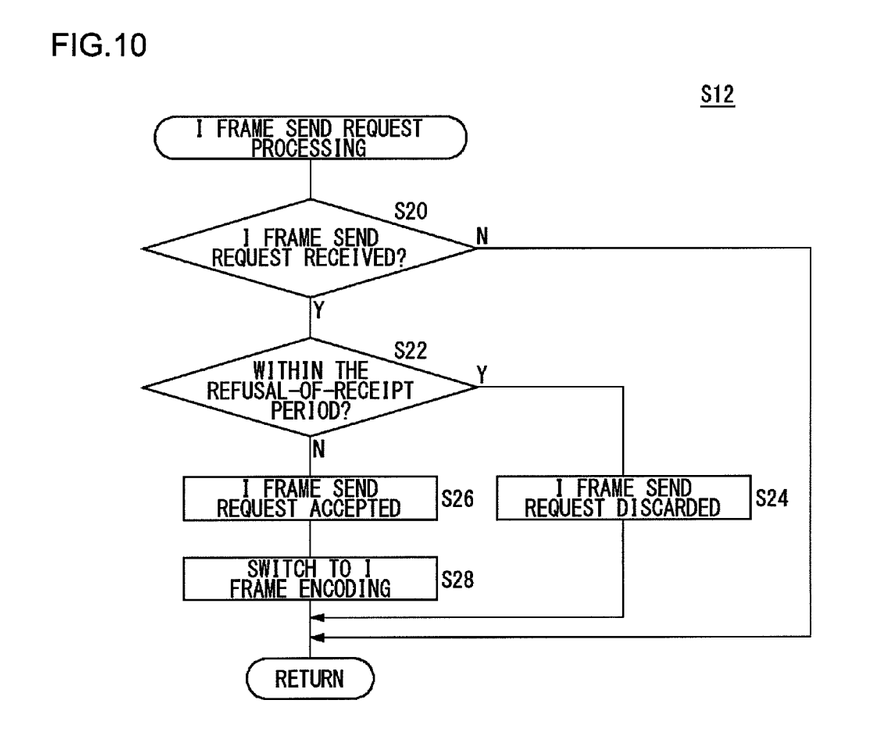
FIG. 10 is a flowchart showing a procedure of the I frame send request processing of FIG. 9.

FIG. 10 is a flowchart showing a procedure of the I frame send request processing of Step S12. When the I frame send request manager 202 receives an I frame send request signal from any one of the multiple receiver-side apparatus 100 (Y of S20), the manager 202 performs the process shown as Step S22 to S28. If no I frame send request signal is received from any one of the multiple receiver-side apparatus 100 (N of S20), the I frame send request signal processing ends.

Upon receiving an I frame send request signal (Y of S20), the manager 202 checks whether or not the received I frame send request signal is one received within the predefined refusal-of-receipt period (S22). If the request signal is one received within the predefined refusal-of-receipt period (Y of S22), the manager 202 discards the received request signal (S24) and the I frame send request processing ends. If the request signal is one received after the predefined refusal-of-receipt period expires (N of S22), the manager 202 accepts the received request signal (S26) and switches the type of frame to be encoded by the video encoder 210 to an I frame (S28).

The information processing apparatus 100 of the present embodiment as described so far has following advantages. Even if frame dropping occurs at the receiver-side of the video code stream, the sender-side can receive the I frame send request signal from the receiver-side and switch the type of frame to be encoded to an I frame in order to prevent any further frame dropping from occurring at the receiver-side. If the multiple receivers exist, it is likely that the multiple receivers will send the I frame send request signals around the same time. For this reason, once an I frame send request signal is accepted and the type of frame to be encoded is switched to an I frame, any further I frame send request signals will not be accepted for a certain period. This can avoid a situation in which the I frames are successively encoded. Furthermore, the bit rate of the video code stream will be lowered under such a condition that a number of the I frame send request signals are frequently generated. This resolves the overload condition in the network that could cause frame dropping and makes the bit rate adjusted to an appropriate level.

The present invention has been described in conjunction with the embodiments thereof. The foregoing embodiments have been given solely by way of illustration. It will be understood by those skilled in the art that various modifications may be made to combinations of the foregoing components and processes, and all such modifications are also intended to fall within the scope of the present invention. Hereinafter, such modifications will be explained.

In the above description, when a P frame or a B frame is not properly received within a GOP, the receiver sends an I frame send request signal, however, the I frame send request signal may also be sent when an I frame is lost.

In the above description, after an I frame send request signal is accepted and the type of frame to be encoded is switched to an I frame, a control is given so that the subsequent I frame send request signals will not be accepted until a certain period expires. In addition to that, another control is given so that no I frame send request signal is accepted until a certain period expires immediately after an I frame is generated, for instance, as the first frame of a GOP. Furthermore, instead of controlling the period for accepting the request signals, the number of the I frame send request signals to be accepted or the frequency of accepting the request signals may be controlled. For instance, the frequency of accepting the request signals can be controlled by decimating the request signals at a certain rate.

In the above description, packet loss in the network is explained as one of causes a frame not to be properly received, however, a similar I frame send request processing can be applied to the case where frame data have not been received in time for the decoding process, for instance, because of packet delay or any other causes.

What is claimed is:

1. An encoding processing apparatus comprising:
an encoder, which encodes a moving image into a plurality of intraframes and interframes so as to generate a video code stream;
a request manager, which receives from a receiver of the video code stream a request signal for requesting to send an intraframe when a frame of the moving image is not properly received by the receiver,
wherein, when the request manager receives the request signal, the request manager signals the encoder to set a frame setting as an intraframe setting while the encoder is encoding the video code stream so that the encoder encodes a subsequent frame of the moving image that is received by the encoder immediately after the request manager signals the encoder as an intraframe regardless of whether the subsequent frame is to be an intraframe or an interframe according to a predetermined order; and
a bit-rate adjuster which provides the encoder with an instruction to temporarily lower the bit rate of the video code stream when the request manager receives a plurality of request signals successively,
wherein the encoder encodes the moving image at a lowered bit rate upon receiving the instruction from the bit-rate adjuster, and
wherein the bit rate of the video code stream is increased by the bit-rate adjuster when an interval of received request signals is equal to or greater than a predetermined duration.

2. An encoding processing apparatus comprising:
an encoder, which encodes a moving image into a plurality of intraframes and interframes so as to generate a video code stream;
a request manager, which receives from at least one of a plurality of receivers of the video code stream a request signal for requesting to send an intraframe when a frame of the moving image is not properly received by at least one of the receivers, and which determines whether or not to accept the received request signal,
wherein, when the request manager determines to accept the request signal, the request manager signals the encoder to set a frame setting as an intraframe setting while the encoder is encoding the video code stream so that the encoder encodes a subsequent frame of the moving image that is received by the encoder immediately after the request manager signals the encoder as an intraframe regardless of whether the subsequent frame is to be an intraframe or an interframe according to a predetermined order; and
a bit-rate adjuster which provides the encoder with an instruction to temporarily lower the bit rate of the video code stream when the request manager receives a plurality of request signals successively,
wherein the encoder encodes the moving image at a lowered bit rate upon receiving the instruction from the bit-rate adjuster, and
wherein the bit rate of the video code stream is increased by the bit-rate adjuster when an interval of received request signals is equal to or greater than a predetermined duration.

3. The apparatus of claim 2, wherein the request manager refuses to accept any of the request signals during a refusal-of-accept period provided as a period for which none of the received request signals are accepted.

4. The apparatus of claim 3, wherein the refusal-of-accept period is a period which starts when a request signal is accepted and extends for a predefined number of frames.

5. An encoding processing method comprising:
encoding a moving image into a plurality of intraframes and interframes so as to generate a video code stream;
receiving from a receiver of the video code stream a request signal for requesting to send an intraframe when a frame of the moving image is not properly received by the receiver,
wherein, when the request signal is received, a frame setting is set during the encoding of the video code stream that encodes a subsequent frame of the moving image that is encountered for encoding immediately after the request signal has been received as an intraframe regardless of whether the subsequent frame is to be an intraframe or an interframe according to a predetermined order; and
lowering a bit rate of the video code stream to temporarily encode the moving image at a lowered bit rate when a plurality of request signals are received successively, wherein the bit rate of the video code stream is increased when an interval of received request signals is equal to or greater than a predetermined duration.

6. An encoding processing method comprising:
encoding a moving image into a plurality of intraframes and interframes so as to generate a video code stream; and
receiving from at least one of a plurality of receivers of the video code stream a request signal for requesting to send an intraframe when a frame of the moving image is not properly received by at least one of the receivers;
determining whether or not to accept the received request signal,
wherein, when the request signal is accepted, a frame setting is set during the encoding of the video code stream that encodes a subsequent frame of the moving image that is encountered for encoding immediately after the request signal has been received as an intraframe regardless of whether the subsequent frame is to be an intraframe or an interframe according to a predetermined order; and
wherein a bit rate of the video code stream is temporarily encoded at a lowered bit rate when a plurality of request signals are accepted successively, and
wherein the bit rate of the video code stream is increased when an interval of received request signals is equal to or greater than a predetermined duration.

7. A non-transitory computer-readable storage medium with a computer program product thereon, the computer program product comprising:
an encoding module for encoding a moving image into a plurality of intraframes and interframes so as to generate a video code stream;
a request managing module for receiving from a receiver of the video code stream a request signal for requesting to send an intraframe when a frame of the moving image is not properly received by the receiver,
wherein, when the request signal is received, a frame setting is set in the encoding module during the encoding of the video code stream for encoding a subsequent frame of the moving image that is received by the encoding module immediately after the request managing module signals the encoding module as an intraframe regardless of whether the subsequent frame is to be an intraframe or an interframe according to a predetermined order; and
a bit-rate adjusting module which provides the encoding module with an instruction to temporarily lower the bit rate of the video code stream when the request managing module receives a plurality of request signals successively,
wherein the encoding module encodes the moving image at a lowered bit rate upon receiving the instruction from the bit-rate adjusting module,
wherein the bit rate of the video code stream is increased by the bit-rate adjusting module when an interval of received request signals is equal to or greater than a predetermined duration.

8. A non-transitory computer-readable storage medium with a computer program product thereon, the computer program product comprising:
an encoding module for encoding a moving image into a plurality of intraframes and interframes so as to generate a video code stream; and
a request receiving module for receiving from at least one of a plurality of receivers of the video code stream a request signal for requesting to send an intraframe when a frame of the moving image is not properly received by at least one of the receivers; and
a request managing module for determining whether or not to accept the received request signal,
wherein, when the request signal is accepted, a frame setting is set in the encoding module during the encoding of the video code stream for encoding a subsequent frame of the moving image that is received by the encoding module immediately after the request managing module signals the encoding module as an intraframe regardless of whether the subsequent frame is to be an intraframe or an interframe according to a predetermined order; and
a bit-rate adjusting module which provides the encoding module with an instruction to temporarily lower the bit rate of the video code stream when the request managing module receives a plurality of request signals successively,
wherein the encoding module encodes the moving image at a lowered bit rate upon receiving the instruction from the bit-rate adjusting module, and
wherein the bit rate of the video code stream is increased by the bit-rate adjusting module when an interval of received request signals is equal to or greater than a predetermined duration.

* * * * *